(12) United States Patent
Park et al.

(10) Patent No.: US 11,906,054 B2
(45) Date of Patent: Feb. 20, 2024

(54) SOLENOID VALVE

(71) Applicants: Hyundai Motor Company, Seoul (KR); Kia Corporation, Seoul (KR); SAMBO MOTORS Co., Ltd, Daegu (KR)

(72) Inventors: In Tae Park, Gyeonggi-do (KR); Jun Young Park, Gyeonggi-do (KR); Dong Woo Kim, Gyeonggi-do (KR)

(73) Assignees: Hyundai Motor Company, Seoul (KR); Kia Corporation, Seoul (KR); SAMBO MOTORS Co., Ltd, Daegu (KR)

( * ) Notice: Subject to any disclaimer, the term of this patent is extended or adjusted under 35 U.S.C. 154(b) by 0 days.

(21) Appl. No.: 17/880,231

(22) Filed: Aug. 3, 2022

(65) Prior Publication Data
US 2023/0184337 A1 Jun. 15, 2023

(30) Foreign Application Priority Data
Dec. 10, 2021 (KR) .................. 10-2021-0177072

(51) Int. Cl.
*F16K 1/36* (2006.01)
*F16K 1/42* (2006.01)
*F16K 31/06* (2006.01)
(52) U.S. Cl.
CPC .............. *F16K 1/36* (2013.01); *F16K 1/42* (2013.01); *F16K 31/0655* (2013.01)

(58) Field of Classification Search
CPC ................................. F16K 31/0655
See application file for complete search history.

(56) References Cited

U.S. PATENT DOCUMENTS
2,041,416 A * 5/1936 Johnson ............ F16K 31/0655
251/76

FOREIGN PATENT DOCUMENTS
EP 3382244 A1 * 10/2018 ............ B21D 22/20

* cited by examiner

*Primary Examiner* — Eric Keasel
(74) *Attorney, Agent, or Firm* — Fox Rothschild LLP

(57) ABSTRACT

The present disclosure relates to a solenoid valve including: a valve seat having a valve flow path; a plunger; a support member disposed at an end of the plunger facing the valve flow path, the support member having an insertion hole into which the valve seat is inserted, and the support member being connected to a spring member configured to elastically support a movement of the plunger; a valve member seated in the support member; an inclined guide surface provided along a periphery of the valve seat; and an inclined recess provided in an inner wall surface of the insertion hole facing the inclined guide surface, in which the inclined recess and the inclined guide surface collectively define a movement path that communicates with the valve flow path, thereby obtaining an advantageous effect of improving stability and reliability.

5 Claims, 6 Drawing Sheets

SOLENOID VALVE

CROSS-REFERENCE TO RELATED APPLICATION

This application claims under 35 U.S.C. § 119(a) the benefit of Korean Patent Application No. 10-2021-0177072 filed in the Korean Intellectual Property Office on Dec. 10, 2021, the entire contents of which are incorporated herein by reference.

BACKGROUND ART

Technical Field

The present disclosure relates to a solenoid valve, and particularly, to a solenoid valve capable of improving stability and reliability.

Description of the Related Art

A solenoid valve may be used to regulate a flow of a fluid or control a pressure.

For example, the solenoid valve may be installed in a power train including an engine of a vehicle and serve to regulate a flow of a fluid such as fuel, oil, and a coolant or control a pressure. The solenoid valve may also be installed in a hydrogen supply line and serve to control a supply of hydrogen.

In general, the solenoid valve includes a solenoid configured to provide driving power, a plunger configured to open or close a valve flow path formed in a valve seat while being rectilinearly moved by the solenoid, and a spring member configured to elastically support the rectilinear movement of the plunger.

Further, a support member configured to support the spring member may be mounted at an end of the plunger that faces the valve seat. A valve member (absorber) may be disposed above an insertion hole formed in the support member so that the valve seat may be inserted into the insertion hole, and the valve member may come into elastically close contact with the valve flow path.

Meanwhile, the accuracy in proportionally controlling the valve member deteriorates if a gap between the valve member and the valve seat (a movement path defined between the valve seat and the insertion hole) is not uniformly opened (increased) in proportion to a movement stroke of the plunger when the valve member opens the valve flow path (when the plunger moves in a direction in which the valve member opens the valve flow path). Therefore, the gap between the valve member and the valve seat needs to be uniformly opened in proportion to the movement stroke of the plunger.

However, in the existing technologies, a peripheral surface of the valve seat may be formed as an inclined surface, whereas an inner wall surface of the insertion hole, which faces the peripheral surface of the valve seat, is formed as a vertical surface. For this reason, there is a problem in that the gap between the valve member and the valve seat is not uniformly opened in proportion to the movement stroke of the plunger in a particular movement stroke section of the plunger.

Therefore, recently, various types of studies have been conducted to improve the stability in proportionally controlling the solenoid valve, but the study results are still insufficient. Accordingly, there is a need to develop a technology to improve the stability in proportionally controlling the solenoid valve.

SUMMARY

The present disclosure has been made in an effort to provide a solenoid valve capable of improving stability and reliability.

In particular, the present disclosure has been made in an effort to uniformly open a gap between a valve member and a valve seat in proportion to a movement stroke of a plunger and improve proportional control accuracy.

The present disclosure has also been made in an effort to contribute to miniaturization of a valve member and ensure performance of a plunger.

The objects to be achieved by the embodiments are not limited to the above-mentioned objects, but also include objects or effects that may be understood from the solutions or embodiments described below.

An exemplary embodiment of the present disclosure provides a solenoid valve including: a valve seat having a valve flow path; a plunger configured to be movable in a direction toward or away from the valve flow path; a support member disposed at an end of the plunger facing the valve flow path, the support member having an insertion hole into which the valve seat may be inserted, and the support member may be connected to a spring member configured to elastically support a movement of the plunger; a valve member seated in the support member and configured to cover the insertion hole and selectively open or close the valve flow path according to the movement of the plunger; an inclined guide surface provided along a periphery of the valve seat; and an inclined recess provided in an inner wall surface of the insertion hole facing the inclined guide surface, in which the inclined recess and the inclined guide surface collectively define a movement path that communicates with the valve flow path.

Embodiments of the solenoid valve described herein may be to uniformly open a gap between the valve member and the valve seat in proportion to a movement stroke of the plunger and improve proportional control accuracy.

That is, the accuracy in proportionally controlling the valve member deteriorates if a gap between the valve member and the valve seat (a movement path defined between the valve seat and the insertion hole) is not uniformly opened (increased) in proportion to a movement stroke of the plunger when the valve member opens the valve flow path (when the plunger moves in a direction in which the valve member opens the valve flow path). Therefore, the gap between the valve member and the valve seat is preferably uniformly opened in proportion to the movement stroke of the plunger. However, in the related art, a peripheral surface of the valve seat may be formed as an inclined surface, whereas an inner wall surface of the insertion hole, which faces the peripheral surface of the valve seat, is formed as a vertical surface. For this reason, there may be a problem in that the gap between the valve member and the valve seat may not be uniformly opened in proportion to the movement stroke of the plunger in a particular movement stroke section of the plunger.

In contrast, according to the embodiment of the present disclosure, the inclined recess may be provided in the inner wall surface of the insertion hole facing the inclined guide surface. Therefore, it may be possible to obtain an advantageous effect of uniformly opening the gap between the valve member and the valve seat in proportion to the movement stroke of the plunger and improving proportional control accuracy.

The benefits of the exemplary solenoid valve according to embodiments described herein may be based on the fact that the accuracy in proportionally controlling the solenoid valve may be improved as the gap in the movement path (the gap between the inclined guide surface and the inclined recess) is kept small and uniform. According to the embodiment of the present disclosure, the fluid may move along the narrow and uniform movement path defined between the surfaces (i.e., the inclined guide surface and the inclined recess) that face each other, such that the gap between the valve member and the valve seat may be uniformly maintained in proportion to the movement stroke of the plunger over the entire movement stroke section of the plunger. Therefore, it may be possible to obtain an advantageous effect of further improving the accuracy in proportionally controlling the valve member.

Moreover, according to the embodiment of the present disclosure, the fluid may move along the narrow and uniform movement path defined between the inclined guide surface and the inclined recess. Therefore, it may be possible to obtain an advantageous effect of minimizing the occurrence of irregular vortices in the flow of the fluid passing through the movement path.

According to the exemplary embodiment of the present disclosure, the inclined recess may be provided in the inner wall surface of the insertion hole and continuously disposed in a circumferential direction of the insertion hole.

An angle of the inclined recess with respect to the inclined guide surface may be variously changed in accordance with required conditions and design specifications.

According to the exemplary embodiment of the present disclosure, the inclined guide surface and the inclined recess may be inclined at the same angle with respect to a reference line parallel to a movement direction of the plunger.

According to another exemplary embodiment of the present disclosure, the inclined guide surface may be inclined at a first angle with respect to a reference line parallel to a movement direction of the plunger, and the inclined recess may be inclined at a second angle different from the first angle with respect to the reference line.

In particular, the second angle of the inclined recess may be larger than the first angle of the inclined guide surface.

Since the second angle of the inclined recess may be larger than the first angle of the inclined guide surface as described above, an inlet end of the movement path may have a larger cross-sectional area than an outlet end of the movement path. Therefore, it may be possible to minimize a differential pressure, which occurs when the fluid passes through the movement path, and ensure the performance in proportionally controlling the fluid passing through the movement path.

In other words, the fluid may be introduced into the inlet end of the movement path that has a larger cross-sectional area than the outlet end of the movement path, which makes it possible to ensure a sufficient flow rate of the fluid to be introduced into the inlet end of the movement path. In contrast, the fluid having passed through the inlet end of the movement path may move through the outlet end of the movement path that has a smaller cross-sectional area than the inlet end of the movement path, which makes it possible to precisely adjust a flow rate of the fluid to be finally introduced into the valve flow path. Therefore, it may be possible to obtain an advantageous effect of ensuring proportional control performance under a condition in which the fluid passes through the solenoid valve at a low or middle flow rate and reducing the occurrence of a differential pressure under a condition in which the fluid passes through the solenoid valve at a high flow rate.

According to the exemplary embodiment of the present disclosure, one end of the insertion hole, which may be adjacent to the valve member, may have a first diameter, and the other end of the insertion hole may have a second diameter larger than the first diameter.

In particular, the valve member may have a diameter larger than the first diameter and smaller than the second diameter.

As described above, in the embodiment of the present disclosure, one end of the insertion hole, which may be adjacent to the valve member, may have the first diameter smaller than the second diameter of the other end of the insertion hole. Therefore, the valve member, which may be seated in the support member to cover the insertion hole, may be manufactured to have a smaller size. Therefore, it may be possible to reduce the amount of comparatively expensive material used for the valve member, thereby reducing manufacturing costs. In addition, the size of the plunger may be further reduced as the size of the valve member may be reduced. On the contrary, the size of the plunger may be increased to improve the operating performance (magnetic force) of the plunger.

DETAILED DESCRIPTION

Figure 1:
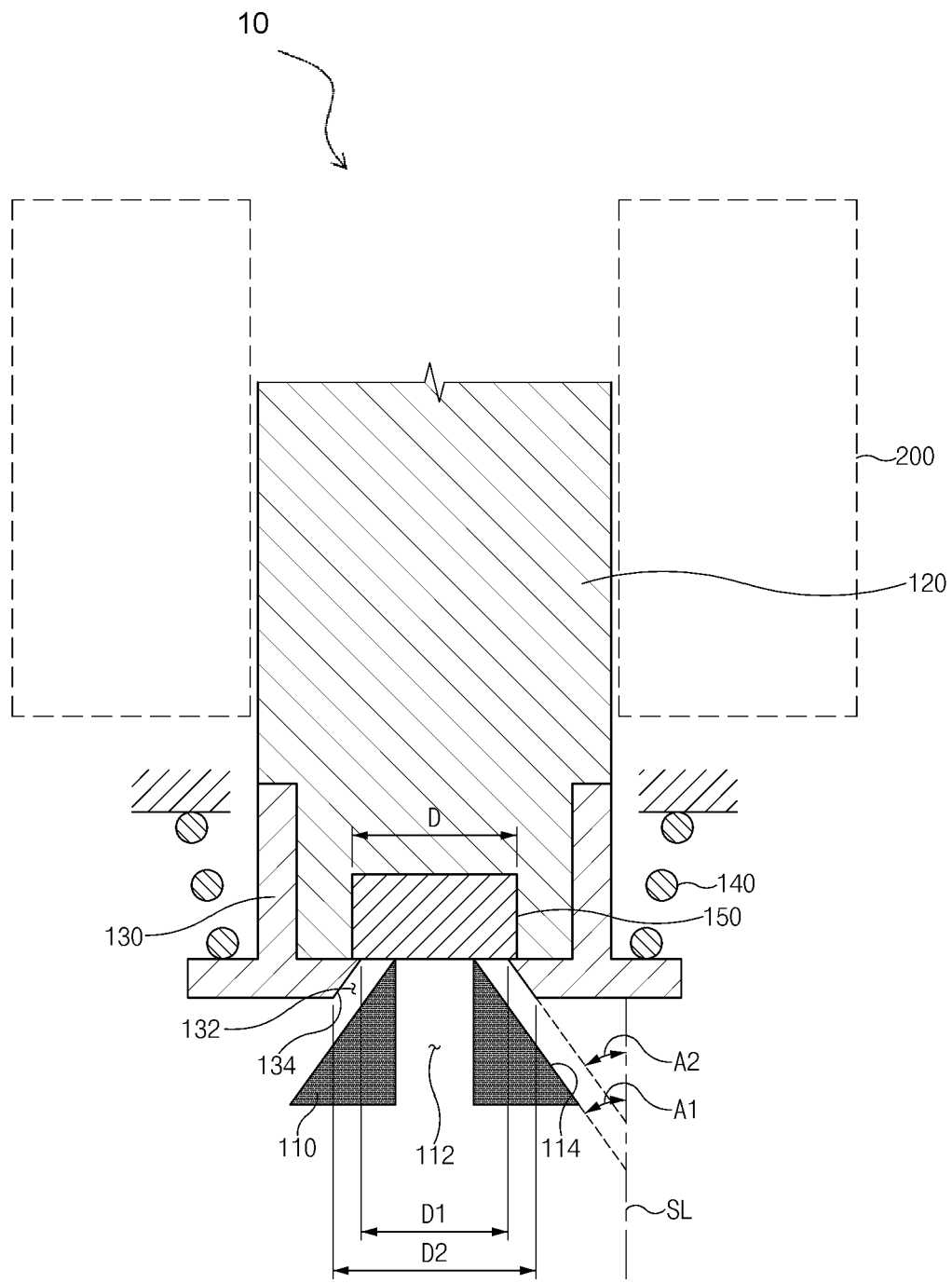
FIG. 1 is a view for explaining a solenoid valve according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. Although described as being used in an vehicular environment, embodiments of the exemplary solenoid valve described herein is no so limited and may be used in any valve situation to control fluid flow.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, exemplary embodiments of the present disclosure will be described in detail with reference to the accompanying drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that may be made by combining A, B, and C.

In addition, the terms such as first, second, A, B, (a), and (b) may be used to describe constituent elements of the embodiments of the present disclosure.

These terms may be used only for the purpose of discriminating one constituent element from another constituent element, and the nature, the sequences, or the orders of the constituent elements may be not limited by the terms.

Further, when one constituent element may be described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element may be provided or disposed above (on) or below (under) another constituent element" includes not only a case in which the two constituent elements may be in direct contact with each other, but also a case in which one or more other constituent elements may be provided or disposed between the two constituent elements. The expression "above (on) or below (under)" may mean a downward direction as well as an upward direction based on one constituent element.

Referring to FIGS. 1 to 6, a solenoid valve 10 according to an embodiment of the present disclosure includes: a valve seat 110 having a valve flow path 112; a plunger 120 configured to move toward or away from the valve flow path 112; a support member 130 disposed at an end of the plunger 120 facing the valve flow path 112, the support member 130 having an insertion hole 132 into which the valve seat 110 may be inserted, and the support member 130 being connected to a spring member 140 configured to elastically support a movement of the plunger 120; a valve member 150 seated on the support member 130 and configured to cover the insertion hole 132 and selectively open or close the valve flow path 112 according to the movement of the plunger 120; an inclined guide surface 114 disposed along a periphery of the valve seat 110; and an inclined recess 134 provided in an inner wall surface of the insertion hole 132 facing the inclined guide surface 114, in which the inclined recess 134 and the inclined guide surface 114 collectively define a movement path that communicates with the valve flow path 112. A plunger configured to move toward or away from the valve flow path is understood to include a plunger that moves in a first direction toward the valve flow path and which may thereafter move away in a second direction away from the valve flow path, or visa versa, and is not limited to only a single direction of movement for the plunger.

For reference, the solenoid valve 10 according to the embodiment of the present disclosure may be mounted in various objects to regulate a flow of a fluid or control a pressure. The present disclosure is not limited or restricted by the type and properties of the object in which the solenoid valve 10 may be mounted.

As an example, the solenoid valve 10 according to the embodiment of the present disclosure may be installed in a power train including an engine of a vehicle and serve to regulate a flow of a fluid such as fuel or oil or control a pressure. More specifically, the solenoid valve 10 may be mounted in a fuel system to control an operation of supplying and injecting fuel, mounted in a cooling system to control circulation for lubrication and cooling, or mounted in a power transmission system to control a pressure. Alternatively, the solenoid valve 10 may be mounted in a hydrogen supply line and serve to control a supply of hydrogen.

Figure 2:
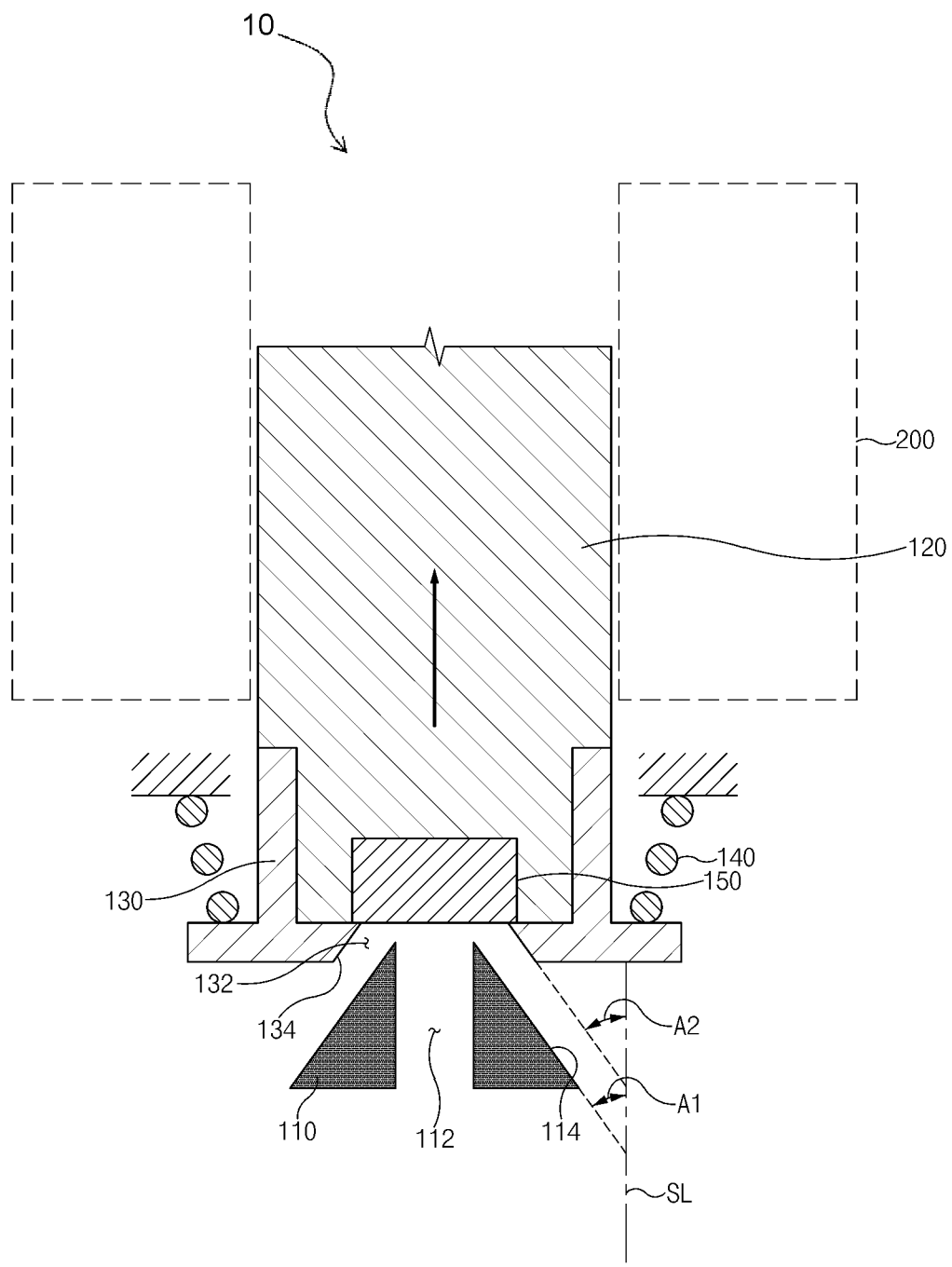
FIGS. 2 and 3 are views for explaining an operational structure of the solenoid valve according to the embodiment of the present disclosure.
Figure 3:
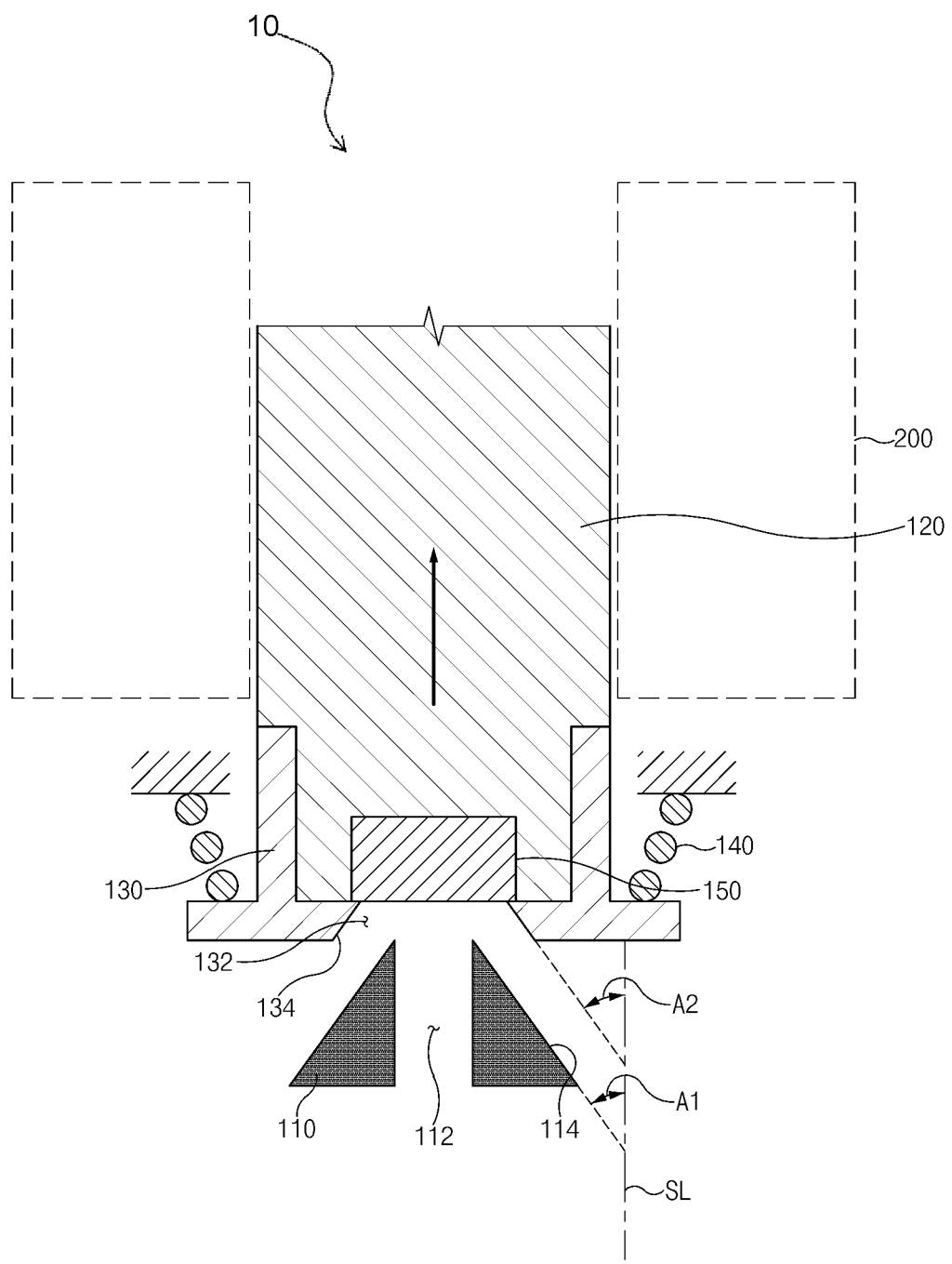

Referring to FIGS. 1 to 3, the valve seat 110 may be disposed at one side of a valve housing (not illustrated). The valve seat 110 may have a valve flow path 112 through which a fluid flows in or out.

The valve housing may have various structures having the valve seat 110. The present disclosure is not restricted or limited by the structure and shape of the valve housing.

For example, the valve seat 110 may be disposed at a lower end of the valve housing. The valve flow path 112 may be provided at an approximately central portion of the valve seat 110 and provided in the form of an approximately circular hole. The valve flow path 112 may penetrate the valve seat 110 in an upward/downward direction (based on FIG. 1).

The valve flow path 112 may be variously changed in size (e.g., diameter) and structure in accordance with required conditions and design specifications. The present disclosure is not restricted or limited by the size and structure of the valve flow path 112.

The inclined guide surface 114 may be provided along the periphery of the valve seat 110. The inclined guide surface 114 and the insertion hole 132 of the support member 130 to be described below collectively define the movement path through which the fluid moves.

In this case, the movement path may be understood as a movement route for the fluid that enters or exits the valve flow path 112 when the valve flow path 112 may be opened.

In particular, the inclined guide surface 114 may be continuously formed in a circumferential direction of the valve seat 110. The valve seat 110 may have an approximately truncated conical cross-sectional shape (trapezoidal cross-sectional shape).

The plunger 120 may move toward or away from the valve flow path 112.

More specifically, the plunger 120 may be rectilinearly moved in the direction toward or away from the valve flow path 112 (the upward/downward direction based on FIG. 1) by driving power of a solenoid 200.

The solenoid 200 may have various structures capable of supplying driving power for operating the plunger 120. The present disclosure may be not restricted or limited by the type and structure of the solenoid 200.

As an example, the solenoid 200 may include a bobbin (not illustrated) disposed in the valve housing so as to surround the plunger 120, a coil (not illustrated) wound around the bobbin, and a yoke (not illustrated) disposed between the bobbin and the plunger 120.

For reference, the movement (movement stroke) of the plunger 120 relative to the solenoid 200 may be controlled by adjusting a value of the electric current to be applied to the coil. A flow rate and a pressure of the fluid passing through the solenoid valve 10 may be proportionally controlled (subjected to proportional control) by controlling the movement of the plunger 120 and thus controlling a degree (an opening degree) to which the valve flow path 112 may be opened or closed by the valve member 150.

Because the solenoid valve 10 according to the present disclosure includes the bobbin and the plunger 120 according to the publicly-known technology having the above-mentioned configuration and operational principle, a detailed description thereof will be omitted.

The support member 130 may be disposed at the end of the plunger 120 facing the valve flow path 112. The spring member 140 may be supported on the support member 130 and elastically support the movement of the plunger 120.

A typical spring (e.g., a coil spring) capable of elastically supporting the movement of the plunger 120 may be used as the spring member 140. The present disclosure is not restricted or limited by the type and structure of the spring member 140.

For example, the spring member 140 may provide an elastic force that moves the plunger 120 in the direction in which the plunger 120 approaches the valve flow path 112 (the direction in which the valve member closes the valve flow path, i.e., the downward direction based on FIG. 1).

The support member 130 may have various structures in accordance with required conditions and design specifications. The present disclosure is not restricted or limited by the structure and shape of the support member 130.

For example, the support member 130 may be provided in the form of a cup having an approximately 'U'-shaped cross-section. A lower end of the plunger 120 may be accommodated in the support member 130.

A flange portion (not illustrated) may be disposed at the lower end of the support member 130 and have a relatively large cross-sectional area. One end of the spring member 140 may be supported on the flange portion, and the other end of the spring member 140 may be supported on an inner wall of the valve housing.

In addition, the insertion hole 132 may be disposed at the lower end of the support member 130. The valve seat 110 may selectively pass through the insertion hole 132 according to the rectilinear movement of the plunger 120.

In particular, the insertion hole 132 and the valve flow path 112 may be coaxially disposed (a center of the insertion hole and a center of the valve flow path may be coincident with each other in the rectilinear movement direction of the plunger).

The valve member 150 may be seated on the support member 130 to cover the insertion hole 132 and selectively opens or closes the valve flow path 112 according to the movement of the plunger 120.

For example, the valve member 150 may be seated in the support member 130. When the plunger 120 rectilinearly moves upward, the valve member 150 rectilinearly moves upward together with the plunger 120, such that the valve flow path 112 may be opened. In contrast, when the plunger 120 moves downward, the valve member 150 rectilinearly moves downward together with the plunger 120, such that the valve flow path 112 may be closed (blocked).

The valve member 150 may have various structures and be made of various materials so that the valve member 150 may open or close the valve flow path 112. The present disclosure is not restricted or limited by the structure and material of the valve member 150.

For example, the valve member 150 may have an approximately cylindrical (or circular plate) shape and be made of an elastic material (e.g., rubber or silicone) so that the valve member 150 may come into elastically close contact with the valve flow path 112.

The inclined recess 134 may be provided in the inner wall surface of the insertion hole 132 facing the inclined guide surface 114, such that the inclined recess 134 and the inclined guide surface 114 collectively define the movement path that communicates with the valve flow path 112.

For reference, in the embodiment of the present disclosure, the configuration in which the inclined recess 134 and the inclined guide surface 114 collectively define the movement path means that a movement route through which the fluid moves may be defined in a space between the inclined guide surface 114 and the inclined recess 134.

For example, when the plunger 120 rectilinearly moves upward, the valve member 150 rectilinearly moves upward together with the plunger 120, such that the valve flow path 112 may be opened and the fluid may move to the valve flow path 112 through the space (movement path) between the inclined guide surface 114 and the inclined recess 134.

In particular, the inclined recess 134 may be provided in the inner wall surface of the insertion hole 132 and continuously disposed in the circumferential direction of the insertion hole 132. The insertion hole 132 may have an approximately truncated conical cross-sectional shape (trapezoidal cross-sectional shape).

In the embodiment of the present disclosure illustrated and described above, the example has been described in which the inclined recess 134 may be provided in the inner wall surface of the insertion hole 132 and continuously disposed in the circumferential direction of the insertion hole 132. However, according to another embodiment of the present disclosure, the inclined recess may be partially provided in the inner wall surface of the insertion hole.

An angle of the inclined recess 134 with respect to the inclined guide surface 114 may be variously changed in accordance with required conditions and design specifications.

For example, referring to FIGS. 1 to 3, the inclined guide surface 114 and the inclined recess 134 may be inclined at the same angle with respect to a reference line parallel to the movement direction of the plunger 120.

In this case, the configuration in which the inclined guide surface 114 and the inclined recess 134 may be inclined at the same angle with respect to the reference line means that a first angle A1 of the inclined guide surface 114 with respect to the reference line may be equal to a second angle A2 of the inclined recess 134 with respect to the reference line.

As described above, according to the embodiment of the present disclosure, the inclined recess 134 may be provided in the inner wall surface of the insertion hole 132 facing the inclined guide surface 114. Therefore, it may be possible to obtain an advantageous effect of uniformly opening a gap between the valve member 150 and the valve seat 110 in proportion to the movement stroke of the plunger 120 and improving proportional control accuracy.

That is, the accuracy in proportionally controlling the valve member 150 deteriorates if the gap between the valve member 150 and the valve seat 110 (the movement path defined between the valve seat and the insertion hole) is not uniformly opened (increased) in proportion to the movement stroke of the plunger 120 when the valve member 150 opens the valve flow path 112 (when the plunger moves in the direction in which the valve member 150 opens the valve flow path). Therefore, the gap between the valve member 150 and the valve seat 110 needs to be uniformly opened in proportion to the movement stroke of the plunger 120.

However, in the related art, a peripheral surface of the valve seat 110 may be formed as an inclined surface, whereas an inner wall surface of the insertion hole 132, which faces the peripheral surface of the valve seat 110, may be formed as a vertical surface. For this reason, there may be a problem in that the gap between the valve member 150 and the valve seat 110 may be not uniformly opened in proportion to the movement stroke of the plunger 120 in a particular movement stroke section of the plunger 120.

In contrast, according to the embodiment of the present disclosure, the inclined recess 134 may be provided in the inner wall surface of the insertion hole 132 facing the inclined guide surface 114. Therefore, it may be possible to obtain an advantageous effect of uniformly maintaining the gap between the valve member 150 and the valve seat 110 in proportion to the movement stroke of the plunger 120 and improving proportional control accuracy.

This may be based on the fact that the accuracy in proportionally controlling the solenoid valve 10 may be improved as the gap in the movement path (the gap between the inclined guide surface and the inclined recess) may be kept small and uniform. According to the embodiment of the present disclosure, the fluid may move along the narrow and uniform movement path defined between the surfaces (i.e., the inclined guide surface and the inclined recess) that face each other, such that the gap between the valve member 150 and the valve seat 110 may be uniformly maintained in proportion to the movement stroke of the plunger 120 over the entire movement stroke section of the plunger 120. Therefore, it may be possible to obtain an advantageous effect of further improving the accuracy in proportionally controlling the valve member 150.

Moreover, according to the embodiment of the present disclosure, the fluid may move along the narrow and uniform movement path defined between the inclined guide surface 114 and the inclined recess 134. Therefore, it may be possible to obtain an advantageous effect of minimizing the occurrence of irregular vortices in the flow of the fluid passing through the movement path.

Figure 5:
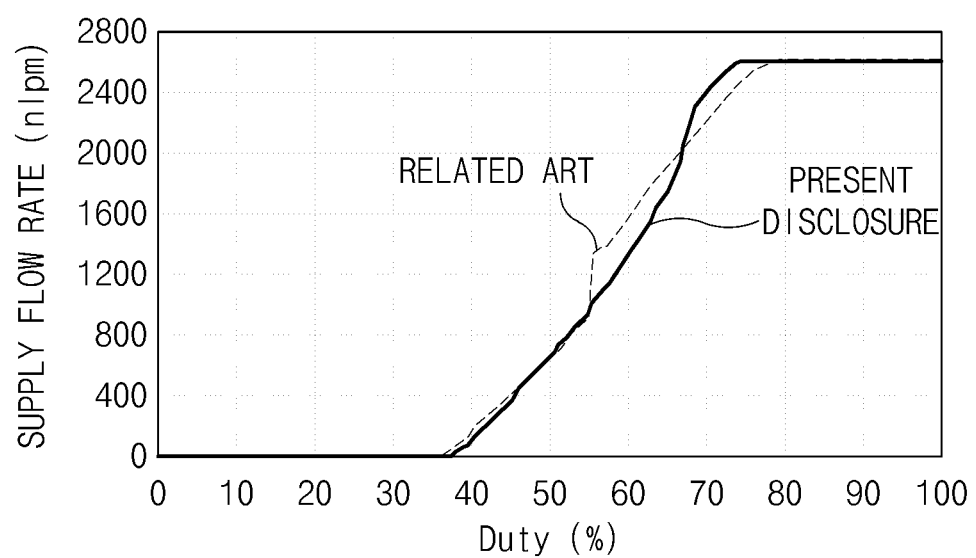
FIG. 5 is a view for explaining a change in supply flow rate with respect to a change in duty value of a solenoid of the solenoid valve according to the embodiment of the present disclosure.
Figure 6:
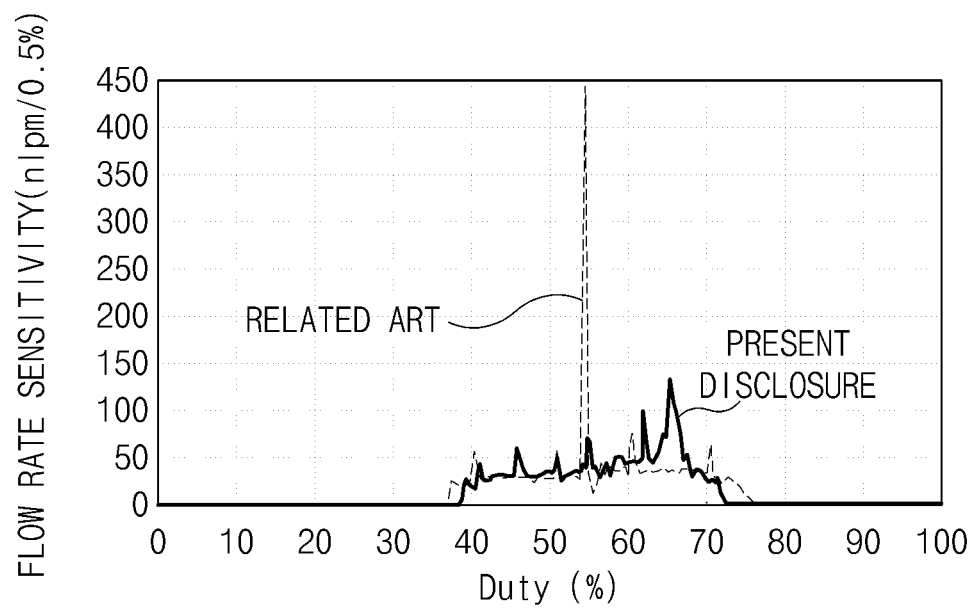
FIG. 6 is a view for explaining a change in flow rate sensitivity with respect to a change in duty value of a solenoid of the solenoid valve according to the embodiment of the present disclosure.

Referring to FIGS. 5 and 6, in the related art, one end and the other end of the insertion hole 132 have the same diameter (the peripheral surface of the valve seat may be formed as an inclined surface and the inner wall surface of the insertion hole facing the peripheral surface of the valve seat may be formed as a vertical surface). For this reason, there may be a problem in that a supply flow rate and flow rate sensitivity rapidly increase in a particular movement stroke section of the plunger 120 (e.g., a section in which a duty value of the solenoid may be 50% to 60%).

In contrast, according to the embodiment of the present disclosure, the inclined recess 134 may be provided in the inner wall surface of the insertion hole 132 facing the inclined guide surface 114, and one end of the insertion hole 132, which may be adjacent to the valve member 150, may have a smaller diameter (i.e., a first diameter D1) than the other end of the insertion hole 132, such that the narrow and uniform movement path may be defined between the inclined guide surface 114 and the inclined recess 134. Therefore, it may be possible to obtain an advantageous effect of minimizing the rapid increase in supply flow rate and flow rate sensitivity according to the duty value of the solenoid 200 in the particular section (i.e., the particular movement stroke section of the plunger) and implementing the comparatively uniform supply flow rate and flow rate sensitivity in proportion to the duty value of the solenoid 200.

Meanwhile, in the embodiment of the present disclosure illustrated and described above, the example has been described in which the first angle A1 of the inclined guide surface 114 is equal to the second angle A2 of the inclined recess 134. However, according to another embodiment of the present disclosure, the first angle A1 of the inclined guide surface 114 may be different from a second angle A2' of the inclined recess 134.

Figure 4:
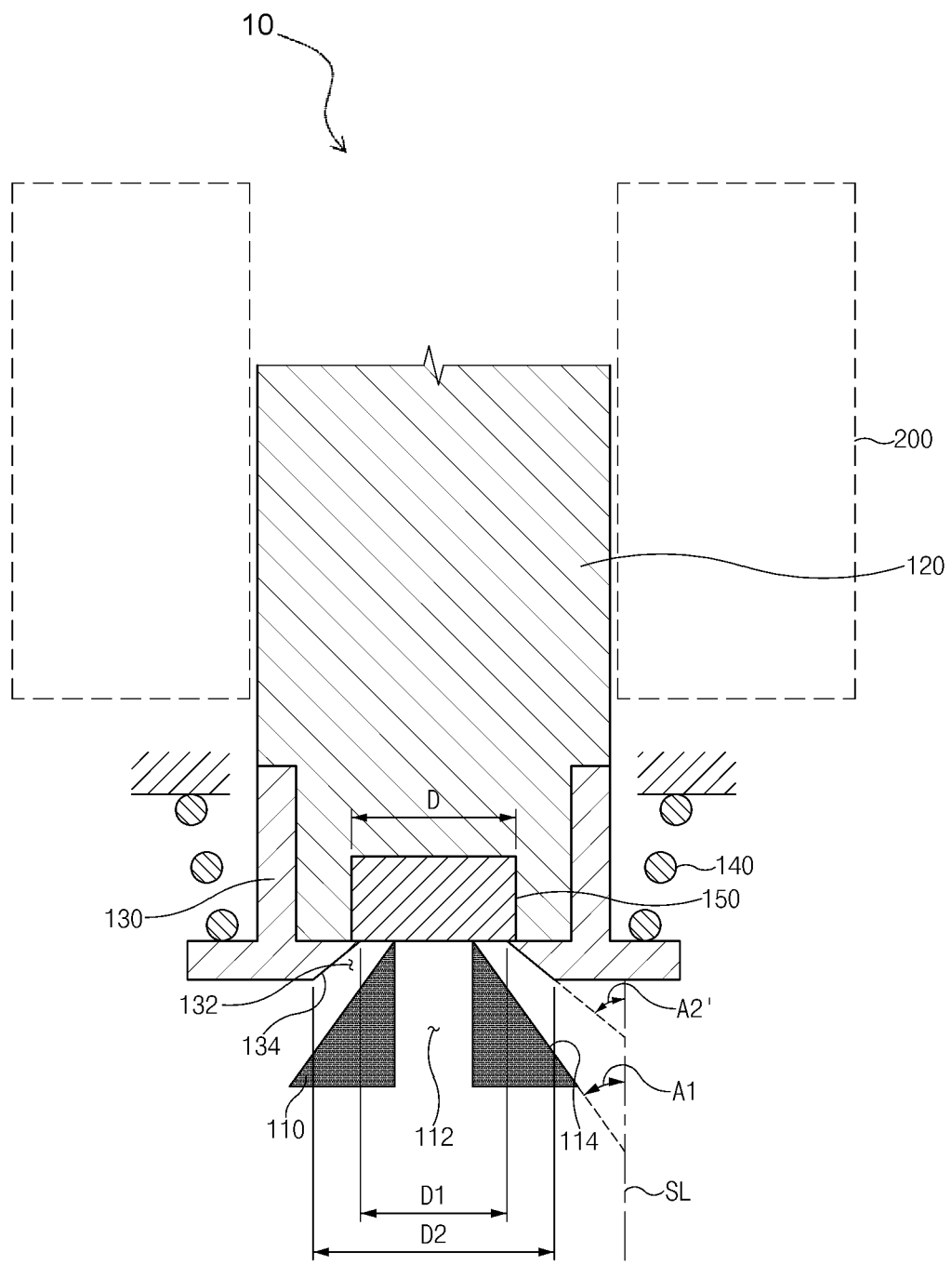
FIG. 4 is a view for explaining an exemplary embodiment of an inclined recess of the solenoid valve according to an embodiment of the present disclosure.

That is, referring to FIG. 4, the inclined guide surface 114 and the inclined recess 134 may be inclined at different angles with respect to the reference line parallel to the movement direction of the plunger 120.

More specifically, the inclined guide surface 114 may be inclined at the first angle A1 with respect to the reference line parallel to the movement direction of the plunger 120, and the inclined recess 134 may be inclined at the second angle A2' different from the first angle A1 with respect to the reference line.

In this case, the difference between the first angle A1 of the inclined guide surface 114 and the second angle A2' of the inclined recess 134 may be variously changed in accordance with required conditions and design specifications.

In particular, the second angle A2' of the inclined recess 134 may be larger than the first angle A1 of the inclined guide surface 114. In this case, the second angle A2' of the inclined recess 134 may be variously changed in accordance with required conditions and design specifications under a condition in which the second angle A2' may be larger than the first angle A1.

Since the second angle A2' of the inclined recess 134 may be larger than the first angle A1 of the inclined guide surface 114 as described above, an inlet end of the movement path (i.e., a lower end of the movement path based on FIG. 4) may have a larger cross-sectional area than an outlet end of the movement path (i.e., an upper end of the movement path adjacent to the valve flow path). Therefore, it may be possible to minimize a differential pressure, which occurs when the fluid passes through the movement path, and ensure the performance in proportionally controlling the fluid passing through the movement path.

In other words, the fluid may be introduced into the inlet end of the movement path that has a larger cross-sectional area than the outlet end of the movement path, which makes it possible to ensure a sufficient flow rate of the fluid to be introduced into the inlet end of the movement path. In contrast, the fluid having passed through the inlet end of the movement path may move through the outlet end of the movement path that has a smaller cross-sectional area than the inlet end of the movement path, which makes it possible to precisely adjust a flow rate of the fluid to be finally introduced into the valve flow path 112. Therefore, it may be possible to obtain an advantageous effect of ensuring proportional control performance under a condition in which the fluid passes through the solenoid valve 10 at a low or middle flow rate and reducing the occurrence of a differential pressure under a condition in which the fluid passes through the solenoid valve 10 at a high flow rate.

Referring back to FIG. 1, since the inclined recess 134 may be provided in the inner wall surface of the insertion hole 132 in the embodiment of the present disclosure, one end (an upper end based on FIG. 1) of the insertion hole 132, which may be adjacent to the valve member 150, may have a first diameter D1, and the other end (a lower end based on FIG. 1) of the insertion hole 132 may have the second diameter D2 larger than the first diameter D1.

In particular, the valve member 150 may have a diameter D larger than the first diameter D1 and smaller than the second diameter D2.

As described above, in the embodiment of the present disclosure, one end of the insertion hole 132, which may be adjacent to the valve member 150, may have the first diameter D1 smaller than the second diameter D2 of the other end of the insertion hole 132. Therefore, the valve member 150, which may be seated in the support member 130 to cover the insertion hole 132, may be manufactured to have a size smaller than the second diameter (D2) (D<D2).

That is, if the one end and the other end of the insertion hole have the same diameter (the insertion hole has a quadrangular cross-sectional shape), the insertion hole preferably has a sufficient size (e.g., a diameter) to allow the valve seat to pass therethrough to inhibit interference between the insertion hole and the valve seat when the plunger moves upward or downward. However, there may be a problem in that a size of the valve member, which may be disposed above the insertion hole, may be inevitably increased as the size of the insertion hole increases.

However, according to the embodiment of the present disclosure, one end of the insertion hole 132, which may be adjacent to the valve member 150, may have the first diameter D1 smaller than the second diameter D2 of the other end of the insertion hole 132. Therefore, the interference between the insertion hole 132 and the valve seat 110 may be inhibited, and the valve member 150, which may be seated in the support member 130 to cover the insertion hole 132 (to cover one end of the insertion hole), may be manufactured to have a smaller size.

Therefore, it may be possible to reduce the amount of comparatively expensive material used for the valve member 150, thereby reducing manufacturing costs. In addition, the size of the plunger 120 may be further reduced as the size of the valve member 150 may be reduced. On the contrary, the size of the plunger 120 may be increased to improve the operating performance (magnetic force) of the plunger 120.

According to the embodiment of the present disclosure as described above, it may be possible to obtain an advantageous effect of improving stability and reliability.

In particular, according to the embodiment of the present disclosure, it may be possible to obtain an advantageous effect of uniformly opening the gap between the valve member and the valve seat in proportion to the movement stroke of the plunger and improving proportional control accuracy.

In addition, according to the embodiment of the present disclosure, it may be possible to contribute to the miniaturization of the valve member and ensure the performance of the plunger.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. A solenoid valve comprising:
   a valve seat having a valve flow path;
   a plunger configured to be movable in a direction toward or away from the valve flow path;
   a support member disposed at an end of the plunger facing the valve flow path, the support member having an insertion hole into which the valve seat is inserted;
   a spring member, the support member being connected to the spring member configured to elastically support a movement of the plunger;
   a valve member seated in the support member, the valve member configured to cover the insertion hole and selectively open or close the valve flow path according to the movement of the plunger;
   an inclined guide surface provided along a periphery of the valve seat; and
   an inclined recess provided in an inner wall surface of the insertion hole facing the inclined guide surface,
   wherein the inclined recess and the inclined guide surface collectively define a movement path that communicates with the valve flow path;

wherein one end of the insertion hole, which is adjacent to the valve member, has a first diameter, and an other end of the insertion hole has a second diameter larger than the first diameter, and wherein the valve member has a diameter larger than the first diameter and smaller than the second diameter.

2. The solenoid valve of claim 1, wherein the inclined recess is provided in the inner wall surface of the insertion hole and continuously disposed in a circumferential direction of the insertion hole.

3. The solenoid valve of claim 1, wherein the inclined guide surface and the inclined recess are inclined at the same angle with respect to a reference line parallel to a movement direction of the plunger.

4. The solenoid valve of claim 1, wherein the inclined guide surface is inclined at a first angle with respect to a reference line parallel to a movement direction of the plunger, and the inclined recess is inclined at a second angle different from the first angle with respect to the reference line.

5. The solenoid valve of claim 4, wherein the second angle is larger than the first angle.

* * * * *